United States Patent
Kreczinski et al.

(10) Patent No.: US 10,882,768 B2
(45) Date of Patent: Jan. 5, 2021

(54) METHOD FOR PROCESSING CONTAMINATED WASTEWATER FROM THE PREPARATION OF ISOPHORONE, ISOPHORONENITRILE AND ISOPHORONEDIAMINE

(71) Applicant: Evonik Operations GmbH, Essen (DE)

(72) Inventors: Manfred Kreczinski, Herne (DE); Robert Jansen, Bottrop (DE); Matthias Woyciechowski, Langenselbold (DE)

(73) Assignee: Evonik Operations GmbH, Essen (DE)

( * ) Notice: Subject to any disclaimer, the term of this patent is extended or adjusted under 35 U.S.C. 154(b) by 91 days.

(21) Appl. No.: 16/122,917

(22) Filed: Sep. 6, 2018

(65) Prior Publication Data
US 2019/0002316 A1 Jan. 3, 2019

Related U.S. Application Data

(62) Division of application No. 14/951,117, filed on Nov. 24, 2015, now Pat. No. 10,144,662.

(30) Foreign Application Priority Data

Nov. 28, 2014 (EP) .................................. 14195357

(51) Int. Cl.
*C02F 1/72* (2006.01)
*C02F 1/04* (2006.01)
*C02F 1/66* (2006.01)
*C02F 1/76* (2006.01)
*C02F 1/78* (2006.01)
*C02F 101/38* (2006.01)
*C02F 103/36* (2006.01)
*C02F 101/34* (2006.01)

(52) U.S. Cl.
CPC ................ *C02F 1/72* (2013.01); *C02F 1/04* (2013.01); *C02F 1/66* (2013.01); *C02F 1/725* (2013.01); *C02F 1/722* (2013.01); *C02F 1/76* (2013.01); *C02F 1/78* (2013.01); *C02F 2101/34* (2013.01); *C02F 2101/38* (2013.01); *C02F 2103/36* (2013.01); *C02F 2209/02* (2013.01); *C02F 2209/06* (2013.01); *C02F 2209/08* (2013.01); *C02F 2209/44* (2013.01)

(58) Field of Classification Search
None
See application file for complete search history.

(56) References Cited

U.S. PATENT DOCUMENTS 5,120,453 A * 6/1992 Frame ................. B01J 31/1616
210/748.14
2013/0253226 A1 9/2013 Galle et al.

FOREIGN PATENT DOCUMENTS

DE 44 28 413 2/1996
WO 2012/076317 6/2012

OTHER PUBLICATIONS

CCOHS (Canadian Center for Occupational Health and Safety), Oxidizing Liquids and Solids, 2002, https://www.ccohs.ca/oshanswers/chemicals/oxidizing/oxiziding_hazards.html. (retrieved Apr. 7, 2020). (Year: 2002).*
Extended Search Report dated Jun. 10, 2015 in European Patent Application No. 14195357.0 (with English translation of category of cited documents).
Yan Xiaomiao et al., "Application of response surface method in the degradation of isophorone by catalytic wet air oxidation," Environmental Chemistry, vol. 12, Dec. 2012, pp. 1865-1873 with partial English translation.
Hu Yuming et al., "Curing Agents" pp. 129-130, Chemistry Industry Press, Feb. 2004, with partial English translation.
Wang Yu et al., "Water Pollution Control Engineering,", pp. 431-432, Chemical Industry Press, Dec. 2007, with partial English translation.
Buddrus and Schmidt, Fundamentals of Organic Chemistry, 4$^{th}$ Ed., De Gruyter, Berlin, 2011, pp. 582-585.

* cited by examiner

*Primary Examiner* — Derek N Mueller
(74) *Attorney, Agent, or Firm* — Grüneberg and Myers PLLC

(57) ABSTRACT

Contaminated wastewater from the preparation of isophorone, isophoronenitrile and isophoronediamine is treated by A) 1. treating the wastewater from the preparation of isophoronenitrile from the reaction of isophorone with hydrogen cyanide by alkaline hydrolysis of isophoronenitrile to isophorone, and the salts of hydrogen cyanide within a pH range of 12.0 to 13.7 and at temperatures of 60 to 200° C. and 2. processing the wastewater from A) 1. by an oxidation, or B) treating the wastewater from the preparation of isophoronenitrile from the reaction of isophorone with hydrogen cyanide by an oxidation, or C) processing the wastewater from A) 1. and the wastewater from the preparation of isophorone and/or the wastewater from the preparation of isophoronediamine by an oxidation.

6 Claims, No Drawings

METHOD FOR PROCESSING CONTAMINATED WASTEWATER FROM THE PREPARATION OF ISOPHORONE, ISOPHORONENITRILE AND ISOPHORONEDIAMINE

This application is a divisional application of U.S. Ser. No. 14/951,117, filed on Nov. 24, 2015, and claims priority claims priority to European Patent Application No. 14195357, filed on Nov. 28, 2014.

BACKGROUND OF THE INVENTION

Field of the Invention

The invention relates to a method for processing contaminated wastewater from the preparation of isophorone, isophoronenitrile and isophoronediamine.

Discussion of the Background

RELATED ART

WO 2012/076317 (PCT/EP2011/070442) discloses a process for preparing 3-aminomethyl-3,5,5-trimethylcyclohexylamine.

There is a detailed description of a three-stage process for preparing 3-aminomethyl-3,5,5-trimethylcyclohexylamine, referred to hereinafter as isophoronediamine or IPDA for short, by I. preparation of isophorone by catalyzed aldol condensations with acetone as reactant:

II. reaction of isophorone with hydrogen cyanide to form isophoronenitrile (IPN, 3-cyano-3,5,5-trimethylcyclohexanone):

III. catalytic hydrogenation and/or catalytic reductive amination (also referred to as aminating hydrogenation) of 3-cyano-3,5,5-trimethylcyclohexanone, referred to hereinafter as isophoronenitrile or IPN for short, to give isophoronediamine.

At the end of all three stages, a wastewater comprising the corresponding end products and also starting materials is obtained.

SUMMARY OF THE INVENTION

A problem addressed by the present invention was that of finding a method for processing the wastewater contaminated with isophorone, isophoronenitrile, isophoronediamine, hydrogen cyanide or salts of hydrogen cyanide, and possibly further substances, wherein the treated wastewater obtained thereby can be sent to a biological wastewater treatment. Isophoronenitrile in particular exhibits poor biodegradability. By the degradation tests according to DIN EN ISO 9888, the isophorone wastewater was classified as non-biodegradable with a COD reduction of <15%.

It has been found that a method according to this invention solves the problem.

In one embodiment, the present invention provides a method for processing contaminated wastewater from the preparation of isophorone, isophoronenitrile and/or isophoronediamine, the method comprising:

A)
1. treating the wastewater from the preparation of isophoronenitrile from the reaction of isophorone with hydrogen cyanide by alkaline hydrolysis of isophoronenitrile to isophorone, and the salts of hydrogen cyanide within a pH range of 12.0 to 13.7 and at temperatures of 60 to 200° C.,
and
2. processing the wastewater from A) 1. by an oxidation,
or
B)
treating the wastewater from the preparation of isophoronenitrile from the reaction of isophorone with hydrogen cyanide by an oxidation,
or
C)
processing the wastewater from A) 1. and the wastewater from the preparation of isophorone and/or the wastewater from the preparation of isophoronediamine by an oxidation.

In another embodiment, the present invention provides a method for processing contaminated wastewater from the preparation of isophorone, isophoronenitrile and/or isophoronediamine, comprising a preparation of 3-aminomethyl-3,5,5-trimethylcyclohexylamine which is carried out by steps I.-III.:

I. preparing isophorone by catalyzed aldol condensation with acetone as reactant, II. reacting isophorone with hydrogen cyanide to form 3-cyano-3,5,5-trimethylcyclohexanone, III. catalytically hydrogenating and/or catalytically reductively aminating 3-cyano-3,5,5-trimethylcyclohexanone to isophoronediamine, by a method comprising
A)
1. treating the wastewater from the preparation of isophoronenitrile from the reaction of isophorone with hydrogen cyanide from step II by alkaline hydrolysis of isophoronenitrile to isophorone, and the salts of hydrogen cyanide within a pH range from 12.5 to 13.7 at temperatures of 60 to 200° C.,
and
2. processing the wastewater from A) 1. by oxidation,
or
B)
treating the wastewater from the preparation of isophoronenitrile II. from the reaction of isophorone with hydrogen cyanide by oxidation,
or
C)
processing the wastewater from A) 1. and the wastewater from the preparation of isophorone from step I and/or the wastewater from the preparation of isophoronediamine from step III by an oxidation.

DETAILED DESCRIPTION OF THE INVENTION

All ranges herein below include all values and subvalues between the lower and higher limit of the range.

The invention provides a method for processing contaminated wastewater from the preparation of isophorone, isophoronenitrile and isophoronediamine, said wastewater comprising especially isophorone, isophoronenitrile, isophoronediamine, hydrogen cyanide or salts of hydrogen cyanide, ammonium salts, alone or in mixtures.

by
A)
1. treating the wastewater from the preparation of isophoronenitrile from the reaction of isophorone with hydrogen cyanide by alkaline hydrolysis of isophoronenitrile to isophorone, and the salts of hydrogen cyanide within a pH range from 12.5 to 13.7 at temperatures of 60 to 200° C., preferably at 80 to 180° C. and more preferably at 95 to 120° C.,
and
2. processing the wastewater from 1. by an oxidation,
or
B)
treating the wastewater from the preparation of isophoronenitrile from the reaction of isophorone with hydrogen cyanide by oxidation,
or
C)
processing the wastewater from 1. and the wastewater from the preparation of isophorone and/or the wastewater from the preparation of isophoronediamine by an oxidation.

The invention preferably provides a method for processing contaminated wastewater from the preparation of isophorone, isophoronenitrile and/or isophoronediamine, wherein the preparation of 3-aminomethyl-3,5,5-trimethyl-cyclohexylamine, called isophoronediamine or IPDA for short hereinafter, is carried out by steps I.-III.:
I. preparing isophorone by catalyzed aldol condensation with acetone as reactant,
II. reacting isophorone with hydrogen cyanide to form 3-cyano-3,5,5-trimethylcyclohexanone (isophoronenitrile),
III. catalytically hydrogenating and/or catalytically reductively aminating (also referred to as aminating hydrogenation) 3-cyano-3,5,5-trimethylcyclohexanone (isophoronenitrile) to isophoronediamine,
and
A)
1. treating the wastewater from the preparation of isophoronenitrile from the reaction of isophorone with hydrogen cyanide from step II by alkaline hydrolysis of isophoronenitrile to isophorone, and the salts of hydrogen cyanide within a pH range from 12.5 to 13.7 at temperatures of 60 to 200° C., preferably at 80 to 180° C. and more preferably at 95 to 120° C.,
and
2. processing the wastewater from 1. by oxidation,
or
B)
treating the wastewater from the preparation of isophoronenitrile II. from the reaction of isophorone with hydrogen cyanide by oxidation,
or
C)
processing the wastewater from A) 1. and the wastewater from the preparation of isophorone from step I and/or the wastewater from the preparation of isophoronediamine from step III by an oxidation.

Description of the Alkaline Hydrolysis 1.

The wastewater obtained in the preparation of isophoronenitrile, having a pH of 1 to 2, contains, as well as other components from the process, ~2000 ppm of isophoronenitrile.

The isophoronenitrile present has to be removed, since the wastewater must not be introduced into the biological wastewater treatment plant.

The problem addressed was that of significantly reducing the isophoronenitrile content in order to be able to send the wastewater directly to the biological wastewater treatment plant.

Alkaline hydrolysis of nitriles to the corresponding carboxylic acids is known from literature (Grundlagen der Organischen Chemie [Fundamentals of Organic Chemistry], page 584, Joachim Buddrus).

It has been found, surprisingly, in a new finding, that isophoronenitrile is cleaved to isophorone within a particular temperature range and a particular pH range.

The alkaline hydrolysis, in a pH range from 12.5 to 13.7, of isophoronenitrile is conducted at temperatures of 60) to 200° C., preferably at 80 to 180° C. and more preferably at 95 to 120° C.

After the alkaline hydrolysis, an isophoronenitrile content in the bottoms of the hydrolysis column of not more than 5 mg/l is attained. The isophorone formed is drawn off at the top of the hydrolysis column by distillation, together with other low boilers, for example acetone, and is fed back to the upstream process.

Suitable bases in this context are all inorganic and organic bases, especially those of the metals of the first and second main groups of the Periodic Table. Preference is given to using aqueous alkali, especially aqueous sodium hydroxide solution. The pH during the hydrolysis vanes from 12.5 to 13.7, preferably from 13.0 to 13.5. The residence time in the bottom of the hydrolysis column depends on the concentration of isophoronenitrile. In general, it is 10 to 30 minutes.

The treated IPN had very good biodegradability with an adaptation time of >30 days. A COD reduction of >90% was attained after about 55 days. The strippable components were ≤10% of the total COD reduction. Thus, there are no hazardous waste air emissions during the ventilation phase in the biological wastewater treatment.

Description of the Oxidation

The method is characterized in that the wastewater from 1. or the wastewater from the preparation of isophoronenitrile from the reaction of isophorone with hydrogen cyanide (step B) or the wastewater from 1. and the wastewater from the preparation of isophorone and/or the wastewater from the preparation of isophoronediamine (step C) are processed by an oxidation in such a way that the COD (COD=chemical oxygen demand, according to DIN 38409 H41) is significantly reduced, hydrogen cyanide or salts thereof present are oxidized to form carbon dioxide, ammonium compounds can be eliminated, and the resulting wastewater may be introduced into a biological wastewater treatment plant for further treatment. The combination of method steps enables further cleaning than only by one step, for example a biological cleaning operation itself. Preferably, a significant reduction in COD of at least 50%, more preferably of 70%, is achieved by the oxidation.

The oxidation step is characterized in that the oxidizing agents usable are substances such as hydrogen peroxide, activated hydrogen peroxide (activated by iron, UV or ozone). Caroat, but preferably sodium hypochlorite solution or hypochlorite produced in situ by chlorine injection. In addition, oxidation can be effected by means of chlorine dioxide.

The oxidation can be executed within a wide pH range, preferably between pH 11 and pH 5, beginning with a higher pH and then moving to lower pH values, during the oxidation process, for example through a cascade of 3 reactors in which different pH values are then established.

The oxidation method is additionally characterized in that it can be conducted at ambient temperatures or else at elevated temperatures to increase the reaction rate. The preferred temperature range during the oxidation is between 10 and 50° C.

The invention also provides a method, characterized in that the wastewater, subsequent to the method described above, is subjected to a biological wastewater treatment.

Having generally described this invention, a further understanding can be obtained by reference to certain specific examples which are provided herein for purposes of illustration only, and are not intended to be limiting unless otherwise specified.

The invention is elucidated in detail by the examples which follow.

EXAMPLES

Examples for A) 1

Example 1

Batch Hydrolysis

In a hydrolysis column, a synthetic wastewater comprising 12 g of isophoronenitrile dissolved in 1500 g of water was adjusted to a pH of 13 with 7 g of NaOH and kept under reflux at 100° C. for 2 hours. The subsequent GC analysis of the bottom product showed an isophoronenitrile content of 2 mg/l.

During the hydrolysis, 100 ml were distilled off and the GC analysis of the distillate showed an isophorone content of 1385 mg/l.

The wastewater (bottom product) thus obtained was processed without any problem in the downstream biological wastewater treatment.

Example 2

Continuous Hydrolysis at pH 13.7

750 ml/h of wastewater from a process plant having an isophoronenitrile content of 1885 mg/l were introduced continuously into the bottom of the hydrolysis column.

By means of closed-loop control of the bottoms level, a residence time in the bottom of 1.5 hours was established, and the pH in the bottoms was adjusted to pH 13.7 by metered addition of 20% NaOH.

The temperature in the bottom of the column was 102° C.

Over a period of 6.5 hours, 4875 ml of process wastewater were thus run through the hydrolysis column. The GC analysis of the outgoing bottom product still showed a residual isophoronenitrile content of 1 mg/l and an isophorone content of 83 mg/l.

Within the 6.5 hours, 340 ml of distillate were drawn off at the top of the column. The GC analysis showed an isophorone content of 14 900 mg/l.

Mass Balance:

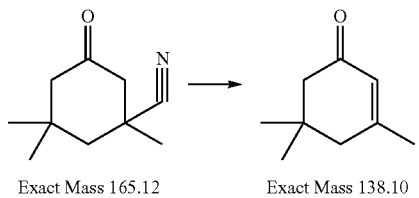

Exact Mass 165.12    Exact Mass 138.10 for every 1000 mg of IPN, 836 mg of IP can form
IPN input: 4.8751*1885 mg/l=9189 mg IPN; =>7682 mg IP
Discharge of IP
1. In the distillate: 340 ml*14 900 mg/l/1000=5066 mg IP
2. In the bottoms: 4535 ml*83 mg/l/1000=376 mg IP
70.8% of the amount of isophorone theoretically possible was detected analytically.

Example 3

Continuous Hydrolysis at pH 11

750 ml/h of wastewater from a process plant having an isophoronenitrile content of 1885 mg/l were introduced continuously into the bottom of the hydrolysis column.

By means of closed-loop control of the bottoms level, a residence time in the bottom of 1.5 hours was established, and the pH in the bottoms was adjusted to pH 11 by metered addition of 20% NaOH.

The temperature in the bottom of the column was 102° C.

Over a period of 6.0 hours, 4500 ml of process wastewater were thus run through the hydrolysis column. The GC analysis of the outgoing bottom product still showed a residual isophoronenitrile content of 620 mg/l and an isophorone content of 53 mg/l.

Example 4

Continuous Hydrolysis at pH 9

750 ml/h of wastewater from a process plant having an isophoronenitrile content of 1885 mg/l were introduced continuously into the bottom of the hydrolysis column.

By means of closed-loop control of the bottoms level, a residence time in the bottom of 1.5 hours was established, and the pH in the bottoms was adjusted to pH 9 by metered addition of 20% NaOH.

The temperature in the bottom of the column was 102° C.

Over a period of 5.0 hours, 3750 ml of process wastewater were thus run through the hydrolysis column. The GC analysis of the outgoing bottom product still showed a residual isophoronenitrile content of 1284 mg/l and an isophorone content of 15 mg/l.

GC Analysis:

| GC settings | | Agilent 6890N |
|---|---|---|
| Chromeleon software | | EXTRELUT |
| Separation columns | HP-5 | Fused silica capillary: 30 m; 0.25 mm ID; film thickness 0.25 µm |
| Temperatures | Injector | 250° C. |
| | Detector (FID) | 250° C. |
| | Oven | 80° C. // 4 min // 7° C./min // 180° C. // 17 min column pressure 17 psi |
| Carrier gas | helium | |
| | Split | 16 ml/min Septum purge 2.0 ml/min |
| Combustion gases | 35 ml/min hydrogen | 300 ml/min air 20 ml/min make-up gas |
| Instruments/reagents | Extrelut NT1 columns from Merck | dil. Standard solution 3.0 mg n-$C_{14}H_{30}$ in 6 ml $CCl_4$ |

-continued

| | |
|---|---|
| Sample preparation | 100 ml of sample are adjusted to pH 2 with HCl solution (dilution factor). The Extrelut NT1 column is placed onto the analytical balance, 1 ml of the acidified sample is applied and the system is weighed. A contact time of 10 min is allowed and elution is effected with 6 ml of standard solution. The eluate is collected in a 10 ml measuring cylinder, the amount of eluate is read off and 2 µl are injected into the GC. |
| Injection volume | 2.0 µl sample solution |
| Evaluation | Internal standard method |
| | Result = mg $C_{14}$ (=ml eluate × 0.5) × Ai × RRF × dil. factor × $10^6$/(weight in mg × Astd) |

Examples of Oxidation

Example 5

A wastewater mixture from the production of isophorone, isophoronenitrile, isophoronediamine, characterized by a COD concentration of 3170 mg/l, was heated to 40° C. and reacted with an about 10% sodium hypochlorite solution. The pH in the mixture on commencement of reaction was 12.9; the temperature was 40° C. Over the course of about 3 hours, the pH fell to 9.3 and was then lowered to a pH of 7.7 with sulphuric acid. After a further hour of reaction time, the reaction was stopped by destroying the remaining residue of sodium hypochlorite with sodium sulphite. The COD concentration measured after the reaction, measured by Hach Lange cuvette tests, in this experiment was 1240 mg/l, corresponding to a COD elimination rate of 60.8%. In a subsequent static biological degradation test for simulation of a biological wastewater treatment plant, an improved COD degradation of 46% was determined, compared to 36% from the untreated wastewater mixture. With regard to the NH4-N (ammonium-nitrogen) content, it was possible to reduce this in the course of the oxidative treatment to a concentration of <5 mg/l NH4-N. Measurement by Hach Lange cuvette tests.

For wastewater introductions into water bodies, legally stipulated limits for nitrogen compounds are fixed.

The target for the limit for NH4N in the wastewater from the treatment plant, in accordance with the invention, is less than or equal to 10 mg/l. Measurement by Hach Lange cuvette tests.

During the biological wastewater treatment, NH4-N is then converted with oxygen supply via NO2-N to NO3-N.

Example 6

A wastewater from an isophoronenitrile production, characterized by a COD content of 4900 mg/l, was heated to about 40° C. and reacted with an about 10% sodium hypochlorite solution. The pH in the mixture on commencement of reaction was 11.3; the temperature was 40° C. After one hour and after two hours of reaction time, further hypochlorite solution was metered in and the pH, if required, was corrected in the direction of pH~10 with NaOH. After about 3 hours of reaction time, the pH was lowered to a pH of 7.3 with sulphuric acid. Over the course of a further hour of reaction time, the pH fell to about 6.7. Subsequently, the reaction was stopped by destroying the remaining residue of sodium hypochlorite with sodium sulphite. The COD concentration measured after the reaction, measured by Hach Lange cuvette tests, in this experiment was 1300 mg/l, corresponding to a COD elimination rate of 73%. In a subsequent static biological degradation test for simulation of a biological wastewater treatment plant, an improved COD degradation of 50% was determined, compared to 14% from the untreated wastewater.

With regard to the NH4-N content, it was possible to reduce this in the course of the oxidative treatment to a concentration of <5 mg/l NH4-N. Measurement by Hach Lange cuvette tests.

Test Method:

Hach Lange cuvette test, measured to ISO 6060-1989, DIN 38409-H41-H44.

European patent application EP14195357 filed Nov. 28, 2014, is incorporated herein by reference.

Numerous modifications and variations on the present invention are possible in light of the above teachings. It is therefore to be understood that within the scope of the appended claims, the invention may be practiced otherwise than as specifically described herein.

The invention claimed is:

1. A method for processing contaminated wastewater from a preparation of isophoronenitrile, the method consisting essentially of:
    B) treating, by oxidation, wastewater from the preparation of isophoronenitrile by reaction of isophorone with hydrogen cyanide,
    wherein at least one oxidizing agent selected from the group consisting of hydrogen peroxide; activated hydrogen peroxide which is activated by iron, UV or ozone; Caroat; sodium hypochlorite solution; hypochlorite produced in situ by chlorine injection; and chlorine dioxide, is used for the oxidation
    wherein the oxidation is conducted within a temperature range between 10 and 50° C.

2. The method according to claim 1, wherein the contaminated wastewater comprises a compound selected from the group consisting of isophorone, isophoronenitrile, hydrogen cyanide or salts of hydrogen cyanide, ammonium salts or in mixtures.

3. The method according to claim 1, wherein the oxidation of B) achieves a reduction in COD, of at least 50%.

4. The method according to claim 1, wherein the oxidation is conducted within a pH range between pH 11 and pH 5.

5. The method according to claim 1, wherein the oxidation is conducted within a pH range between pH 11 and pH 5 in a cascade comprising 3 reactors in which different pH values are established.

6. The method according to claim 1, further comprising: subjecting the wastewater subsequently to a biological wastewater treatment.

* * * * *